(12) United States Patent
Kawabe et al.

(10) Patent No.: US 7,798,519 B2
(45) Date of Patent: Sep. 21, 2010

(54) SIDE AIRBAG DEVICE

(75) Inventors: Hitoshi Kawabe, Aichi-ken (JP); Takanobu Ikeda, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 125 days.

(21) Appl. No.: 12/219,784

(22) Filed: Jul. 29, 2008

(65) Prior Publication Data
US 2009/0039623 A1 Feb. 12, 2009

(30) Foreign Application Priority Data
Aug. 10, 2007 (JP) ............................. 2007-209565
Aug. 10, 2007 (JP) ............................. 2007-209567

(51) Int. Cl.
*B60R 21/21* (2006.01)
(52) U.S. Cl. ................................ 280/728.3; 280/730.2
(58) Field of Classification Search ............. 280/728.3, 280/730.2, 728.1
See application file for complete search history.

(56) References Cited

U.S. PATENT DOCUMENTS

2004/0155441 A1* 8/2004 Hofmann ................. 280/730.2
2006/0061072 A1* 3/2006 Suekuni et al. ........... 280/730.2
2006/0061073 A1* 3/2006 Naruse et al. ............ 280/730.2
2007/0046000 A1* 3/2007 Sato et al. ................ 280/730.2

FOREIGN PATENT DOCUMENTS

JP A-2006-088774 4/2006

* cited by examiner

*Primary Examiner*—Paul N Dickson
*Assistant Examiner*—Keith Frisby
(74) *Attorney, Agent, or Firm*—Posz Law Group, PLC

(57) ABSTRACT

A device includes an airbag and an outer cover. The airbag is accommodated between a body and a rear seat of a vehicle. The outer cover covers a space defined between the body and the rear seat from the passenger compartment and is exposed to the passenger compartment. When an impact greater than a predetermined level is applied to the vehicle body, a thin portion of the outer cover is ruptured by the pressure from inflation of the airbag. This forms an opening in the outer cover. The airbag is then inflated into the passenger compartment from the opening of the outer cover. The end at the part of the outer cover corresponding to the opening and facing toward the rear seat is entirely formed by the end of the outer cover.

4 Claims, 10 Drawing Sheets

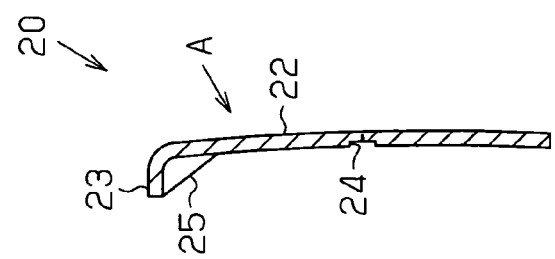
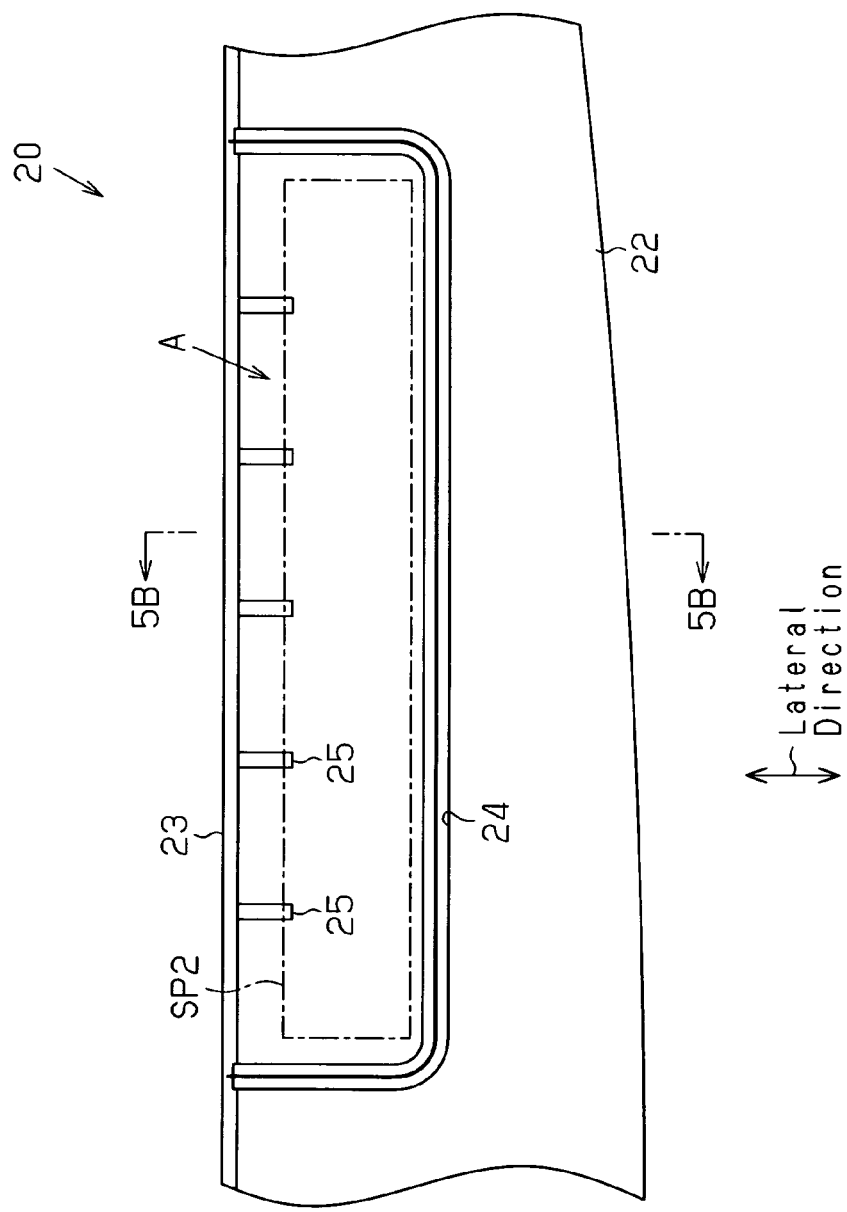

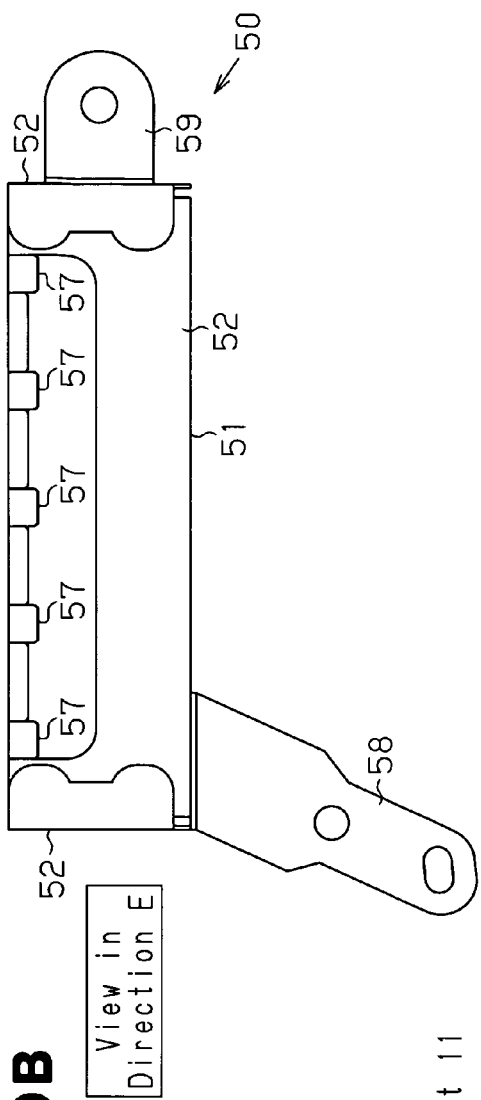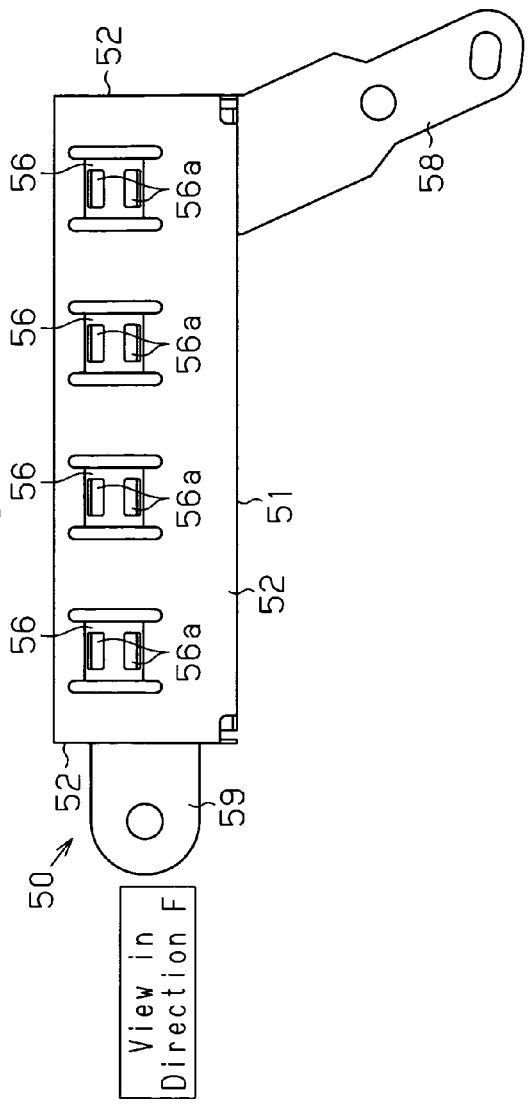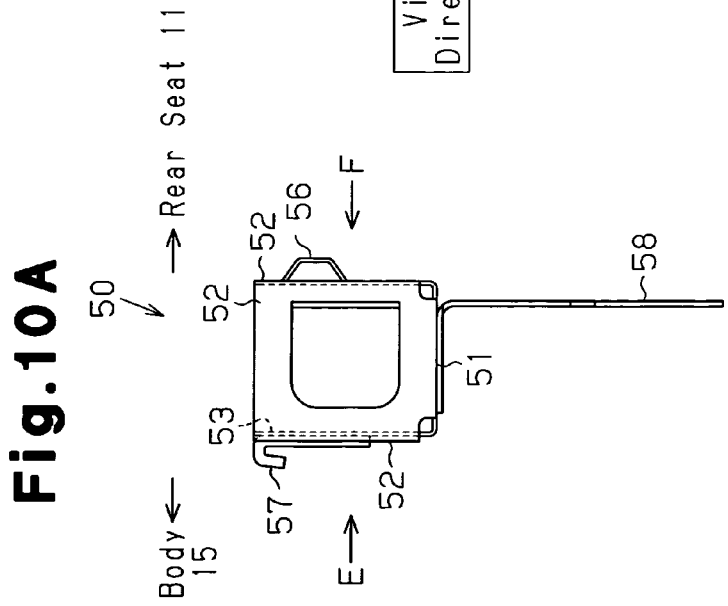

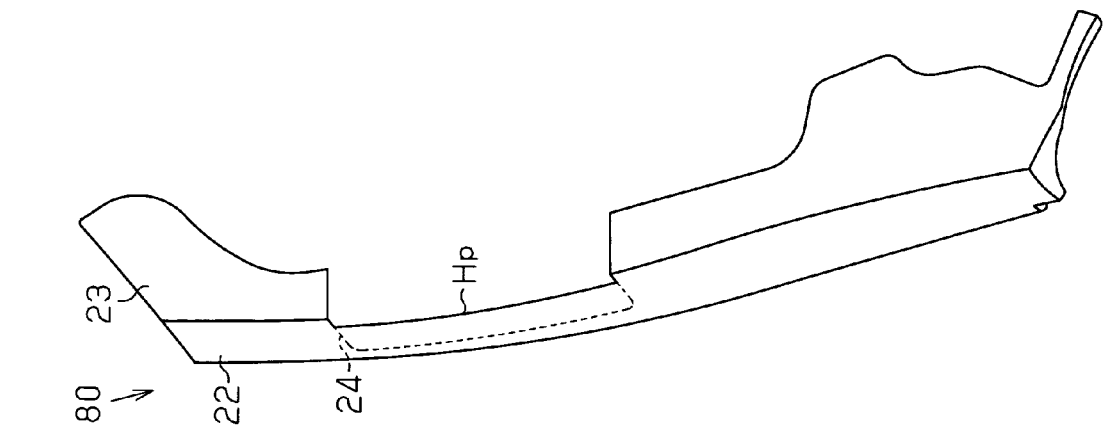
Fig.13
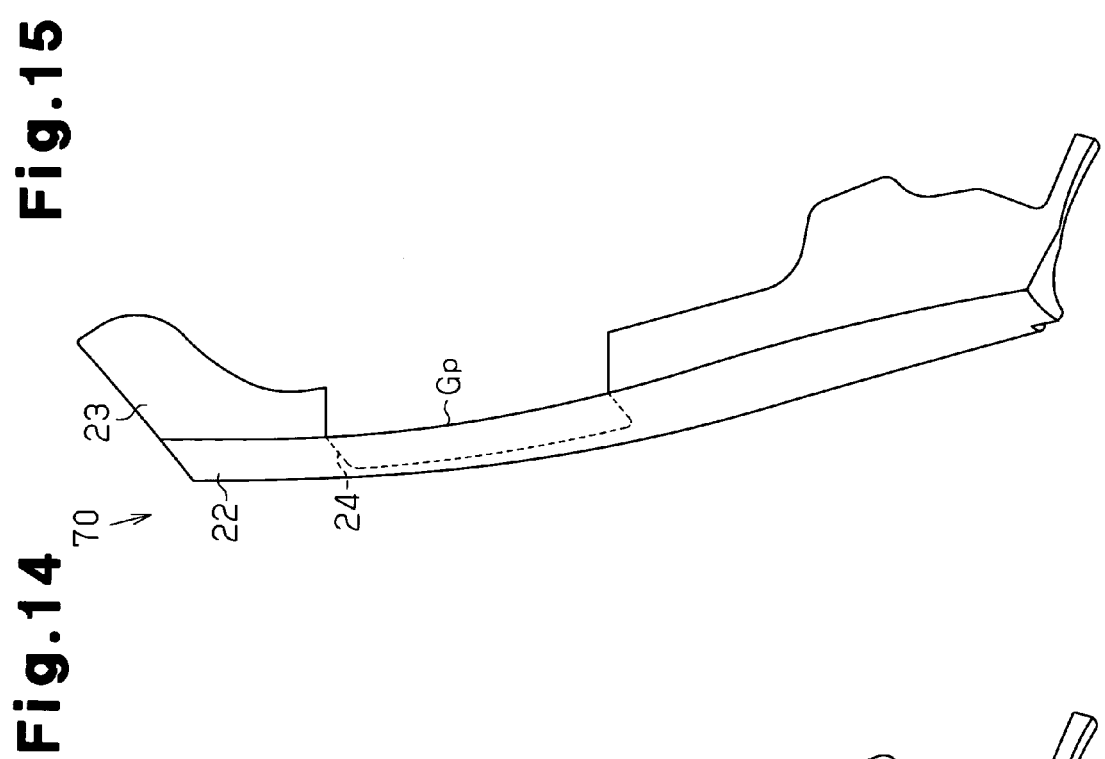
Fig.14
Fig.15

SIDE AIRBAG DEVICE

BACKGROUND OF THE INVENTION

The present invention relates to a side airbag device that cushions side impacts in a vehicle.

A typical side airbag device includes an inflatable airbag that deploys between a side wall of a vehicle body and an occupant sitting on a seat in the passenger compartment. When an impact that is greater than a predetermined level is applied to the side of the vehicle, gas is supplied into the airbag to near instantaneously inflate and deploy the airbag. This cushions the occupant from the impact.

Japanese Laid-Open Patent Publication No. 2006-88774 describes a side airbag device. This device is arranged in a space between the rear seat and vehicle body. More specifically, the airbag is arranged between the rear seat and the body in a folded state. The space between the rear seat and the vehicle body is hidden by a cover from the passenger compartment. During deployment the airbag is inflated toward the cover, which is made of resin and includes a thin portion. The pressure applied to the cover by the inflated airbag ruptures the thin portion. The thin portion surrounds the part of the bag through which the airbag is inflated.

In the above device, the thin portion of the cover is ruptured when the airbag is inflated, and the ruptured portion opens towards the passenger compartment so as to form an opening in the cover. The airbag is inflated in the passenger compartment through the opening of the cover. To deploy the airbag in the desired manner, each part of the thin portion in the cover must be ruptured at a predetermined timing as the airbag inflates.

However, it is difficult to rupture the entire cover in the desired manner. Particularly, as the thin portion becomes longer, proper rupturing of the thin portion becomes further difficult. If the timing at which part of the thin portion ruptures is delayed or if the cover ruptures at a part slightly separated from the thin portion during airbag inflation, the airbag and the cover would come into contact with each other in an unexpected manner. This would result in the airbag being temporarily inflated and deployed in an unexpected manner. The difficulty in rupturing the thin portion in the desired manner is one factor that interferes with proper functioning of the side airbag device.

SUMMARY OF THE INVENTION

It is an object of the present invention to provide a side airbag device that properly deploys an airbag.

One aspect of the present invention is a side airbag device for use in a vehicle having a body, passenger compartment, and a rear seat. The side airbag device includes an airbag accommodated in a folded state between the body of the vehicle and the rear seat of the vehicle. The airbag is inflated and deployed in the passenger compartment between the vehicle body and an occupant seated on the rear seat when an impact greater than a predetermined level is applied to the vehicle body. A cover exposed to the passenger compartment covers a space between the body and the rear seat from the passenger compartment. The cover includes a thin portion formed in a wall defining a surface exposed to the passenger compartment. The thin portion is ruptured by pressure produced during inflation of the airbag to form an opening in the cover. The airbag is inflated into the passenger compartment through the opening. The cover includes a part corresponding to the opening having an end facing toward the rear seat that is entirely formed by an end of the cover.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5A is an enlarged plan view of a part corresponding to an opening of an outer cover taken from an airbag assembly side;

FIG. 5B is a cross-sectional view taken along line 5B-5B in FIG. 5A;

FIG. 10A is a side view showing a box from the longitudinal direction;

FIG. 10B is a side view showing the box from the direction of arrow E in FIG. 10A;

FIG. 10C is a side view showing the box from the direction of arrow F in FIG. 10A;

FIG. 13 is a perspective view showing an outer cover used in an airbag device of a comparative example;

FIG. 14 is a perspective view showing an outer cover used in another embodiment according to the present invention; and FIG. 15 is a perspective view showing an outer cover used in a further embodiment according to the present invention.

DETAILED DESCRIPTION OF THE PREFERRED EMBODIMENTS

A side airbag device according to a preferred embodiment of the present invention will now be discussed.

Figure 1:
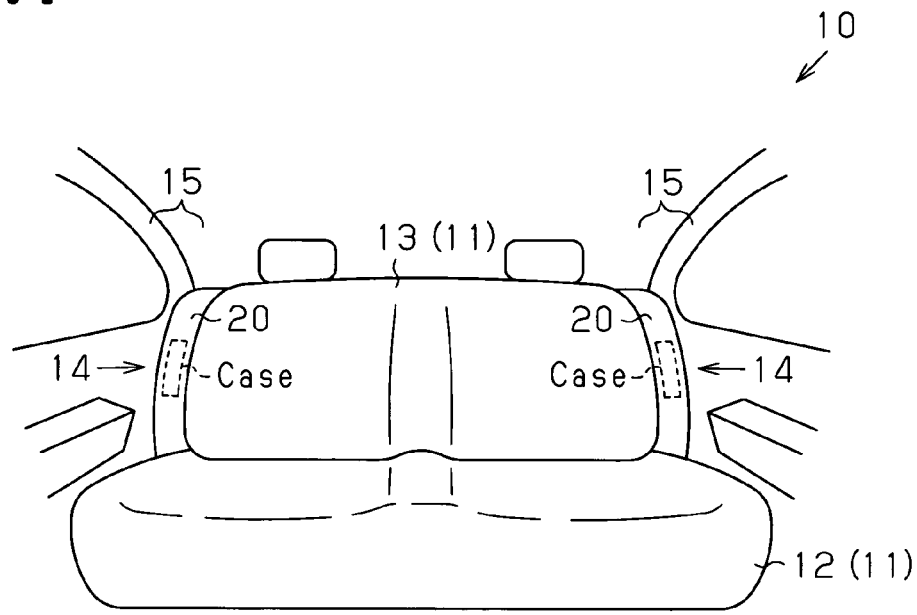
FIG. 1 is a schematic diagram showing the periphery of a rear seat in a vehicle equipped with a side airbag device according to a preferred embodiment of the present invention.

As shown in FIG. 1, a rear seat 11 is arranged in the passenger compartment of a vehicle 10. The rear seat 11 includes a seat cushion 12 and a backrest 13. A side airbag device 14 is arranged in the passenger compartment between a wall formed by a body 15 of the vehicle 10 and the backrest 13 of the rear seat 11. The side airbag device 14 is arranged on both lateral sides of the rear seat 11.

The side airbag device 14 has a case for accommodating an airbag (not shown) in a folded state, and an outer cover 20 for hiding the case in the passenger compartment. The case is arranged between the body 15 and the backrest 13. The outer cover 20 is arranged so as to substantially cover the entire space between the body 15 and the backrest 13. The case includes a housing 34 of an inner cover 30 (described later) and a box 50.

Figure 2:
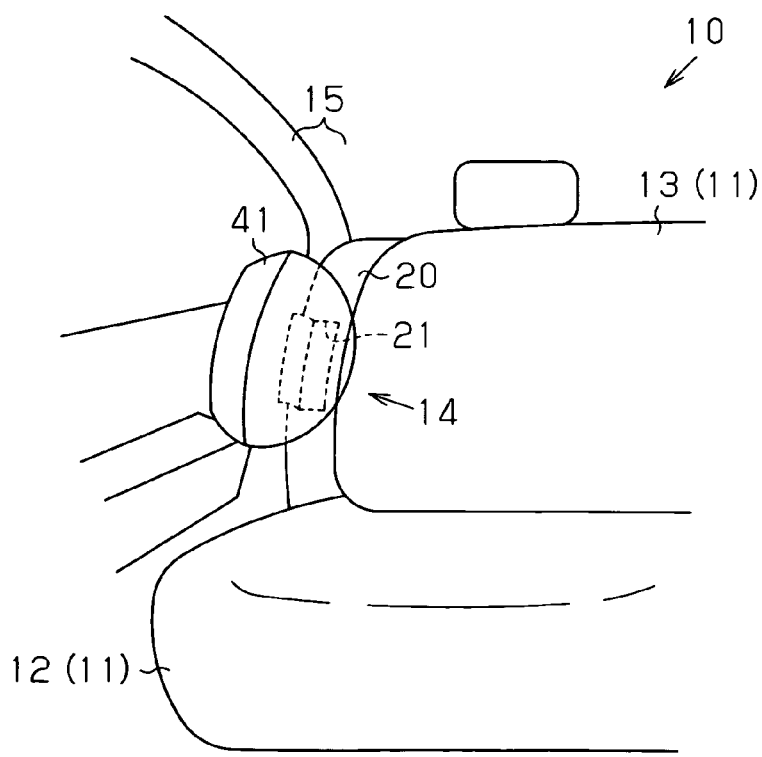
FIG. 2 is a schematic diagram showing the periphery of the rear seat when an airbag is deployed.

Referring to FIG. 2, in the side airbag device 14, when an impact greater than a predetermined level is applied to the body 15, an airbag 41 is inflated. The inflated airbag 41 applies pressure to and ruptures part of the outer cover 20 thereby forming an opening 21 in the outer cover 20. Then, the airbag 41 extends out of the opening 21 for deployment in the space between the body 15 and an occupant sitting on the rear seat 11.

Figure 3:
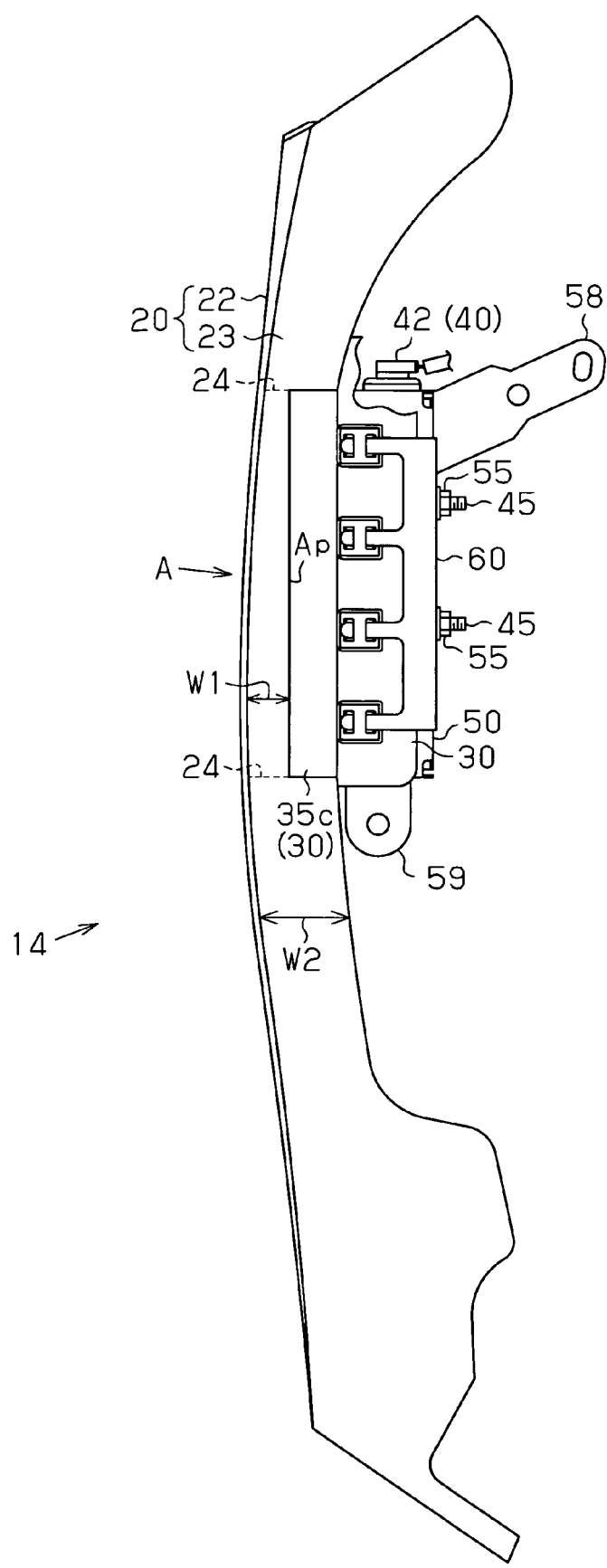
FIG. 3 is a side view showing the side airbag device.
Figure 4:
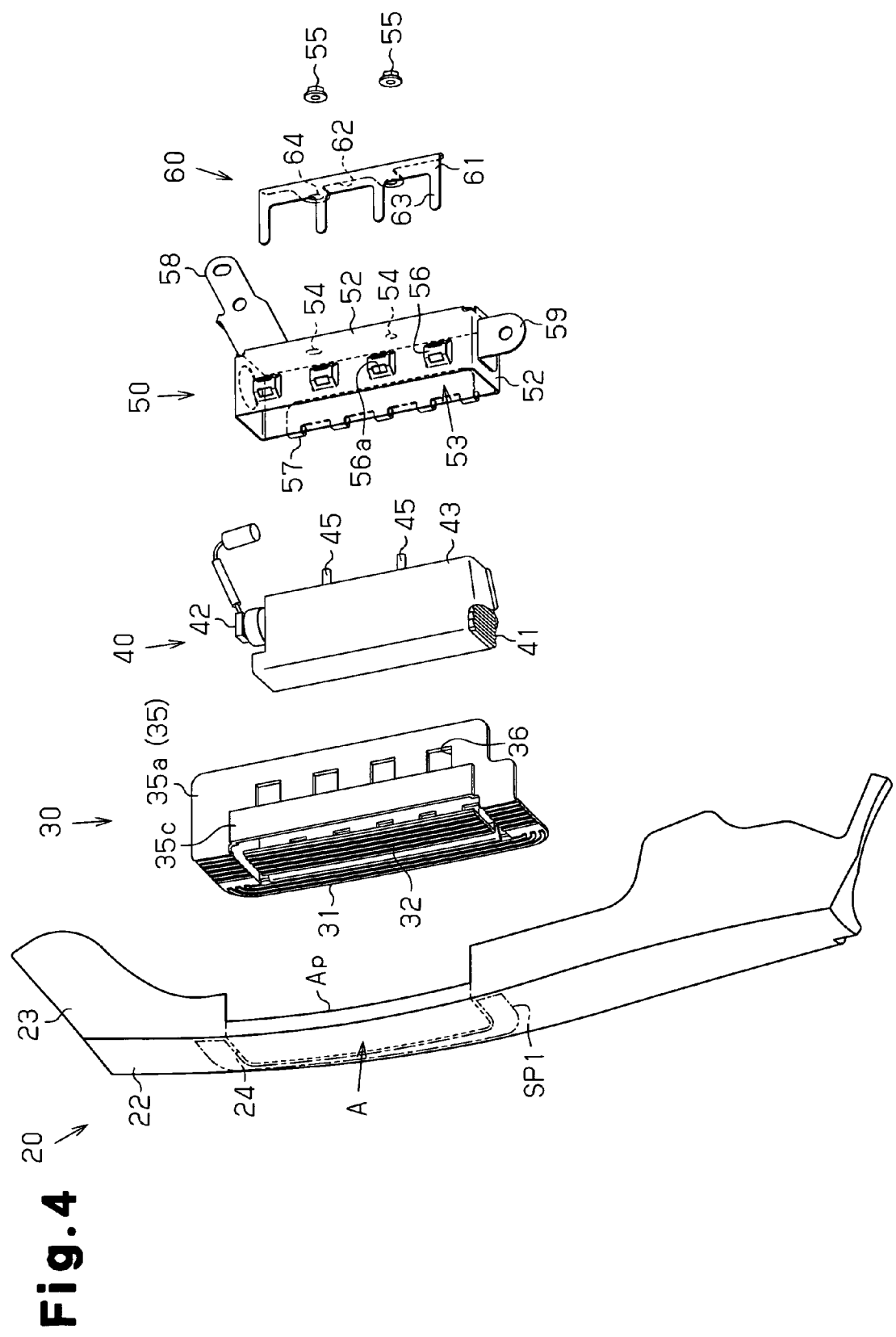
FIG. 4 is an exploded perspective view showing the side airbag device.

As shown in FIGS. 3 and 4, in addition to the outer cover 20, the side airbag device 14 includes an inner cover 30, an airbag assembly 40, the box 50, and a holder 60.

The outer cover 20 includes an elongated first wall 22 and a second wall 23. The outer cover 20 is bent at the boundary of the first wall 22 and the second wall 23. The outer cover 20 is attached to the vehicle 10 so that the first wall 22 hides the space between the body 15 (see FIG. 1) and the backrest 13 of the rear seat 11 from the passenger compartment. In this state, an ornamental surface of the outer cover 20 is defined by a portion of the first wall 22 that is exposed to the passenger compartment. The second wall 23 of the outer cover 20 extends from the first wall 22 towards the airbag assembly 40 along a side surface of the backrest 13 of the rear seat 11. The outer cover 20 is made from a relatively inexpensive resin material such as polypropylene (PP).

A thin portion 24 is formed at a longitudinally middle part of the outer cover 20. When the airbag 41 is inflated, the thin portion 24 is ruptured to form the opening 21 (see FIG. 2) of the outer cover 20. In this embodiment, the part (part A shown in FIGS. 3 and 4) corresponding to the opening 21 of the outer cover 20 includes part of the first wall 22 and part of the second wall 23. In the second wall 23, part A has a dimension, or width W1, while other parts have a larger dimension, or width W2, as shown in FIG. 3. Part A has a distal end Ap that faces toward the rear seat 11. In this embodiment, the periphery of part A excluding the distal end Ap defines the thin portion 24. Therefore, the thin portion 24 does not extend along the entire distal end Ap of part A. Further, the distal end Ap of part A is not connected to, or free from, other parts of the outer cover 20. The opening 21 forms in the outer cover 20 when inflation of the airbag 41 ruptures the outer cover 20 along the thin portion 24.

The thin portion 24 is integrally molded with the outer cover 20 in a mold. Afterwards, the outer cover 20 undergoes machining to form the portion for accommodating the airbag assembly 40. A groove is then formed to complete the thin portion 24. The thin portion 24 may also be molded on the outer cover 20 in a mold. However, this would restrict the degree of freedom in the shape of ornamental embossments (e.g., grain) formed on the surface of the outer cover 20. Furthermore, a phenomenon such as sink in which the surface of the outer cover 20 is linearly depressed may easily occur.

As shown in FIGS. 5A and 5B, five ribs 25 are formed on part A of the outer cover 20. Each rib 25 is located near where the airbag assembly 40 is accommodated at the boundary of the first wall 22 and the second wall 23. Each rib 25 is formed by a linear projection extending in the lateral direction of the elongated outer cover 20. The ribs 25 are formed at equal intervals along the longitudinal direction of the outer cover 20. Each rib 25 connects the first wall 22 and the second wall 23 of the outer cover 20. The rib 25 has a triangular cross-sectional shape when viewed from the longitudinal direction of the outer cover 20.

Figure 6A:
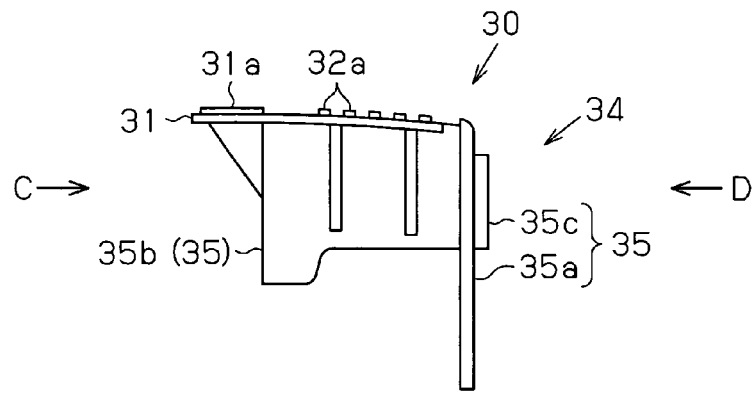
FIG. 6A is a side view showing an inner cover along the longitudinal direction thereof.
Figure 6B:
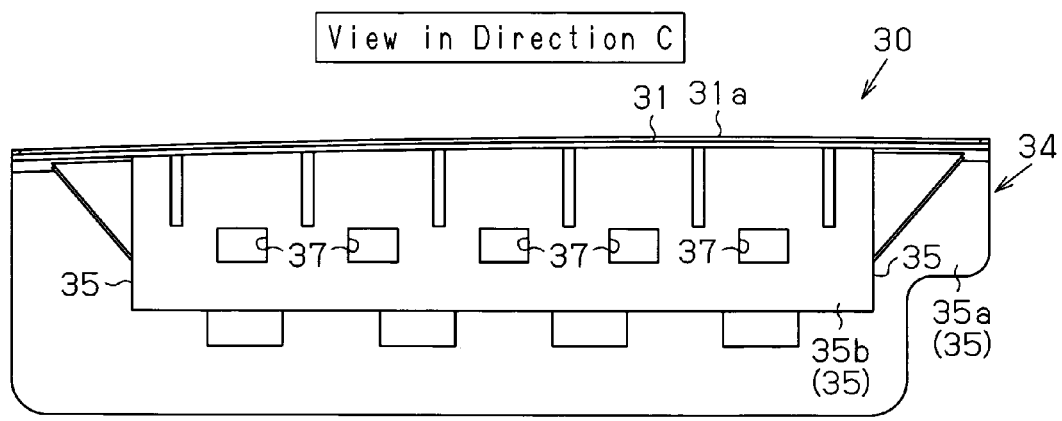
FIG. 6B is a side view showing the inner cover from the direction of arrow C in FIG. 6A.
Figure 6C:
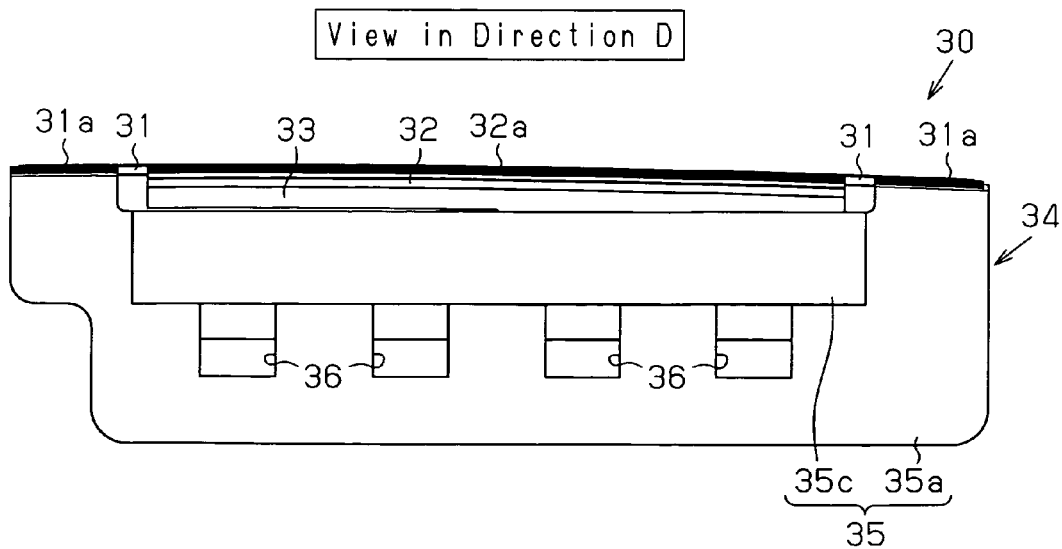
FIG. 6C is a side view showing the inner cover from the direction of arrow D in FIG. 6A.
Figure 7:
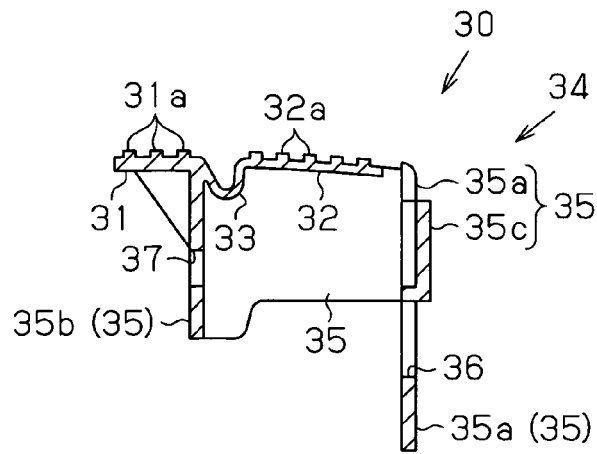
FIG. 7 is a cross-sectional view of the inner cover.

As shown in FIGS. 6 and 7, the inner cover 30 is includes a stay 31, a door 32, a hinge 33, and the housing 34. The inner cover 30 is made from a relatively soft resin material such as olefin thermoplastic elastomer (TPO).

The stay 31 is fixed to the outer cover 20 at part "SP1", shown in FIG. 4. The stay 31 has an inner edge arranged to extend along the edge of the opening 21 of the outer cover 20, that is, the outer edge of the thin portion 24. Three linear projections 31a extending along the longitudinal direction of the inner-cover 30 are formed on the surface of the stay 31 facing toward the outer cover 20. Vibration welding or ultrasonic-welding is performed to fix the stay 31 to the outer cover 20. The tips of the projections 31a of the stay 31 are welded to the surface of the outer cover 20 that faces toward the airbag assembly 40.

The door 32 is made of thin plate and is fixed to the outer cover 20 at a part corresponding to the opening 21, namely, part SP2 shown in FIG. 5A. Five linear projections 32a extending along the longitudinal direction of the inner cover 30 are formed on the surface of the door 32 facing toward the outer cover 20. Vibration welding or ultrasonic welding is performed to fix the door 32 and the outer cover 20. The tips of the projections 32a of the door 32 are welded to the surface of the outer cover 20 that faces toward the airbag assembly 40.

The hinge 33 has a substantially C-shaped cross-section and extends linearly along the longitudinal direction of the inner cover 30. The hinge 33 has one side connected to the stay 31 and another side connected to the door 32. The inner cover 30 is attached to the outer cover 20 so that the hinge 33 is arranged in correspondence with the thin portion 24 of the outer cover 20.

The hinge 33 is elastically deformed when the thin portion 24 of the outer cover 20 ruptures during inflation of the airbag 41. This pivots the part of the outer cover 20 corresponding to the opening 21 together with the door 32 of the inner cover 30 about the hinge 33. The pivoting widely opens the part of the outer cover 20 corresponding to the opening 21 (see FIG. 2) towards the passenger compartment.

The housing 34 is part of the case that accommodates the airbag assembly 40 and forms the part of the case that is near the outer cover 20. The housing 34 guides the airbag 41 towards the opening 21 of the outer cover 20 during inflation of the airbag 41. Specifically, the housing 34 includes a wall 35 surrounding the space through which the airbag 41 passes. The wall 35 extends from the stay 31. Four fitting holes 36, which are through holes, are formed in a wall portion 35a of the wall 35 facing toward the rear seat 11. Five engagement holes 37, which are through holes, are formed in a wall portion 35b of the wall 35 facing away from the rear seat 11. The wall portion 35a restricts deployment of the airbag 41 towards the rear seat 11 during inflation of the airbag 41. The fitting holes 36 and the engagement holes 37 fix the box 50 to the inner cover 30.

Figure 8A:
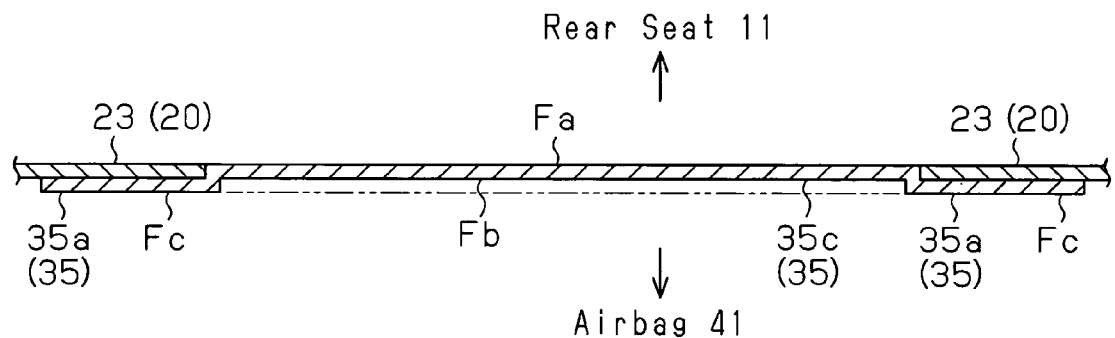
FIG. 8A is a partially enlarged cross-sectional view showing a wall of the side airbag device near the rear seat.
Figure 8B:
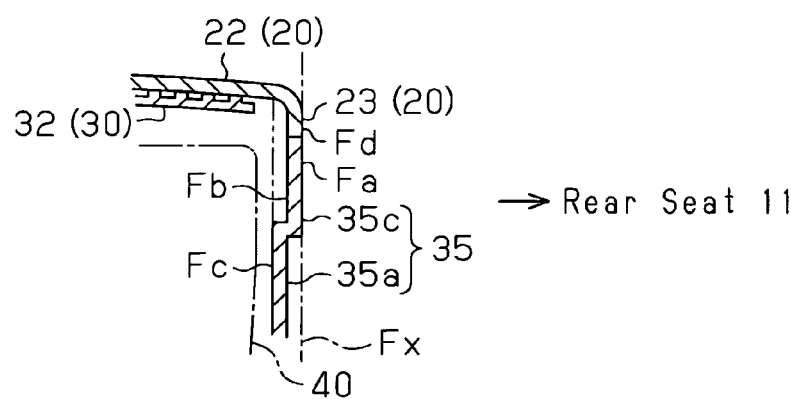
FIG. 8B is a partially enlarged cross-sectional view showing the wall of the side airbag device near the rear seat.

In this embodiment, the wall portion 35a of the inner cover 30 forms part of a wall of the side airbag device 14 facing toward the rear seat 11 (see FIG. 3), as shown in FIGS. 8A and 8B. Specifically, the wall of the side airbag device located near the first wall 22 of the outer cover 20 is formed by the second wall 23 of the outer cover 20. Further, the wall of the side airbag device located distant from the first wall 22 of the outer cover 20 is formed by the wall 35a of the inner cover 30. In this embodiment, the wall 35 of the inner cover 30 functions as a wall member.

The outer cover 20 and the inner cover 30 forming the surface of the side airbag device 14 facing toward the rear seat 11, specifically, the surface of the second wall 23 in the outer cover 20 facing toward the rear seat 11 and the surface of the wall portion 35a in the inner cover 30 facing toward the rear seat 11 are flush with each other.

As shown in FIG. 8A, at the part where the surface of the side airbag device 14 facing toward the rear seat 11 is formed by the wall portion 35a of the inner cover 30, the outer cover 20 and the inner cover 30 overlap each other in a state in which the wall portion 35a of the inner cover 30 is closer to the airbag 41 than the second wall 23 of the outer cover 20.

As shown in FIGS. 8A and 8B, the middle part of the wall portion 35a in the inner cover 30 forming the side surface of the side airbag device 14 that faces toward the rear seat 11 is entirely depressed. The middle part includes a surface Fa facing toward the rear seat 11 and an opposite surface Fb, which is depressed from the surrounding surface Fc. The wall portion 35a has a substantially uniform thickness. As shown in FIGS. 6A and 6C, a projecting portion 35c located near the first wall 22 of the outer cover 20 projects towards the rear seat 11 at the wall portion 35a. As shown in FIG. 8B, the surface Fa of the projecting portion 35c and a surface Fd of the second wall 23 of the outer cover 20 are arranged along plane Fx.

The inner cover 30 is integrally molded with a mold. The outer cover and the inner cover may be integrally formed from the same mold. In this case, however, the structure of the mold used for molding becomes extremely complicated. Generally, the manufacturing cost becomes high when forming a resin molded article with a single mold having a complicated structure compared to when forming two separate bodies that form a molded resin product with two molds having a simple structure. From this aspect, the outer cover 20 and the inner cover 30 are separately molded with different molds in this embodiment.

Figure 9:
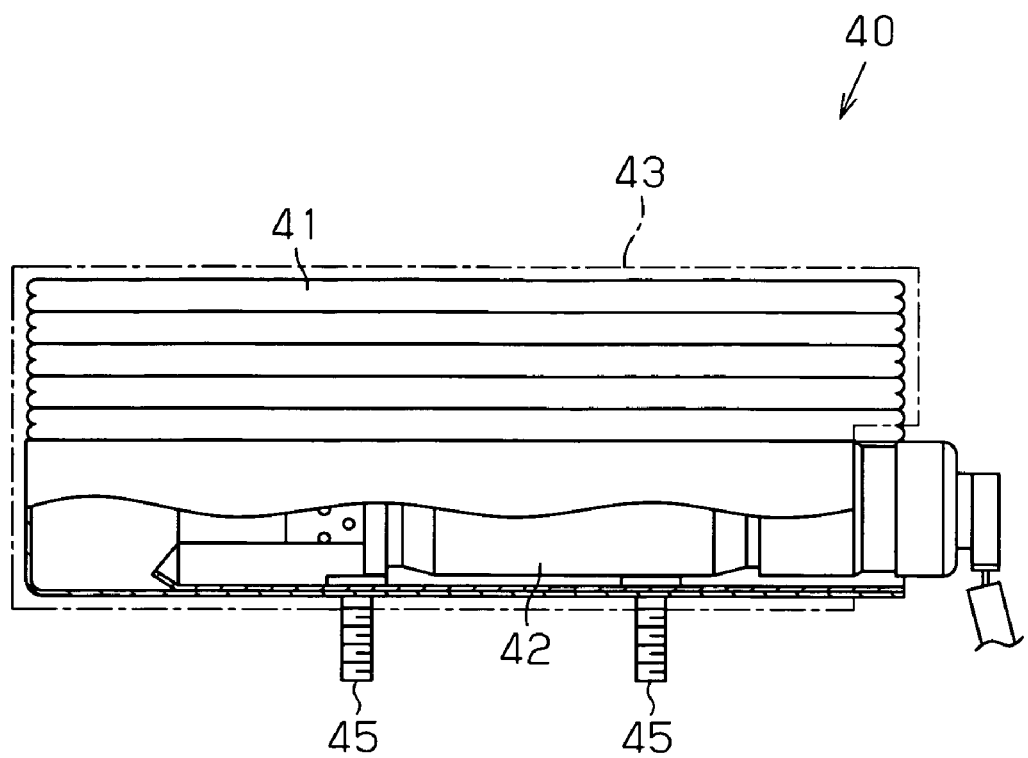
FIG. 9 is a partial cross-sectional view of an airbag assembly.

As shown in FIG. 9, the airbag 41 and a retainer 42 are accommodated in an accommodation bag 43 in the airbag assembly 40. The retainer 42 has substantially tubular shape. An inflator (not shown) for generating gas to inflate the airbag 41 is fixed inside the retainer 42. The retainer 42 is inserted into the airbag 41. The airbag 41 is accommodated in the accommodation bag 43 in a folded state. Two fastening screws 45 are attached to the retainer 42. The fastening screws 45 are used to fasten the airbag assembly 40 to the box 50. The distal ends of the fastening screws 45 are projected outside after being extended through both of the airbag 41 and the accommodation bag 43.

As shown in FIGS. 10A to 10C, the box 50 is formed to be a substantially rectangular parallelepiped. The box 50 has one bottom wall 51 and four side walls 52. The airbag assembly 40 is fixed in an accommodation portion 53 defined by the space between the walls 51 and 52. As shown in FIG. 4, two through holes 54 are formed in the bottom wall 51 of the box 50. The airbag assembly 40 is fixed to the box 50 by fastening nuts 55 to the fastening screws 45 of the airbag assembly 40 inserted to the through holes 54. The box 50 is formed by pressing and bending a metal sheet.

Four outwardly projecting fitting projections 56 are formed on the side wall 52 of the box 50 facing toward the rear seat 11. The fitting projections 56 are formed at positions corresponding to the fitting holes 36 (see FIG. 6C) of the inner cover 30. Each fitting projection 56 is shaped so that it can be fitted to the corresponding fitting hole 36. Five hooks 57 having a U-shaped cross-section are formed on the side wall 52 of the box 50 facing toward the body 15. The hooks 57 are formed at positions corresponding to the engagement holes 37 of the wall portion 35b (see FIG. 6B) of the inner cover 30. Each hook 57 is shaped so that it can be engaged with the corresponding engagement hole 37.

The box 50 is fixed to the inner cover 30 by engaging the hooks 57 of the box 50 to the engagement holes 37 of the inner cover 30, and fitting the fitting projections 56 of the box 50 to the fitting holes 36 of the inner cover 30.

Two outwardly extending brackets 58 and 59 are integrally formed on the box 50. The box 50 is attached to the vehicle 10 by fixing the brackets 58 and 59 to the body 15. An insertion hole 56a is formed in each fitting projection 56. An elongated plate-shaped member extending along the side wall 52 of the box 50 is inserted into the insertion hole 56a of each fitting projection 56. Each insertion hole 56a is exposed to the outer side in a state in which the fitting projection 56 of the box 50 is fitted into the fitting hole 36 of the inner cover 30 (see FIG. 3). Part of the holder 60, which will be described later, is inserted into each insertion hole 56a. This prevents the fitting projections 56 from falling out of the fitting holes 36 after fitting the fitting projections 56 of the box 50 into the fitting holes 36 of the inner cover 30.

As shown in FIG. 4, the holder 60 includes two walls 61 and 62. The holder 60 is bent at the boundary of the walls 61 and 62 at a substantially right angle to form an L-shaped cross-section. The wall 61 includes four parallel comb teeth 63 arranged at equal intervals. Two insertion holes 64 are formed in the other wall 62. The holder 60 prevents the fitting projections 56 of the box 50 from falling out of the fitting holes 36 of the inner cover 30 in the same manner as the insertion holes 56a. The holder 60 is formed by pressing and punching a metal sheet and then bending the pressed out material.

Figure 11:
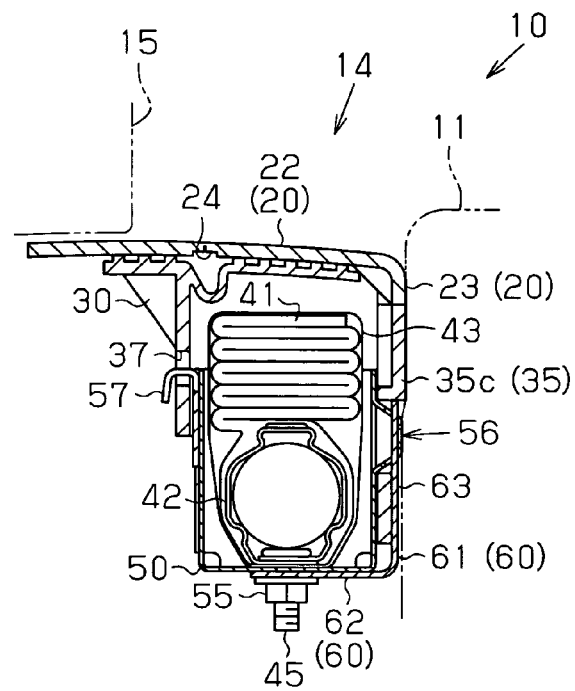
FIG. 11 is a cross-sectional view showing the side airbag device when the airbag is not inflated.

The holder 60 is fixed in the following manner. As shown in FIG. 11, the fastening screws 45 of the airbag assembly 40 is first inserted into the through holes 54 of the box 50, and the box 50 is fixed to the inner cover 30. In this state, the comb teeth 63 of the holder 60 are inserted into the insertion holes 56a of the fitting projection 56 of the box 50, and the fastening screws 45 are inserted into the insertion holes 64 of the holder 60. Thereafter, the nuts 55 are fastened to the fastening screw 45. This fixes the holder 60 to the box 50 with the airbag assembly 40.

The operation of the side airbag device 14 will now be described with reference to FIGS. 11 and 12. FIG. 11 shows the cross-sectional structure of the side airbag device 14 of when the airbag 41 is not inflated.

As shown in FIG. 11, the airbag 41 is accommodated in the box 50 in the folded state when impact is not applied to the body 15. When an impact greater than a predetermined level is applied to the body 15 and detected by an impact sensor (not shown), gas is ejected out of the inflator from the retainer 42. This charges the gas into the airbag 41 and inflates the airbag 41. The airbag 41 is guided into the passenger compartment by the side wall 52 of the box 50 and the housing 34 of the inner cover 30. The airbag 41 inflates towards the outer cover 20, that is, the door 32 of the inner cover 30.

Figure 12A:
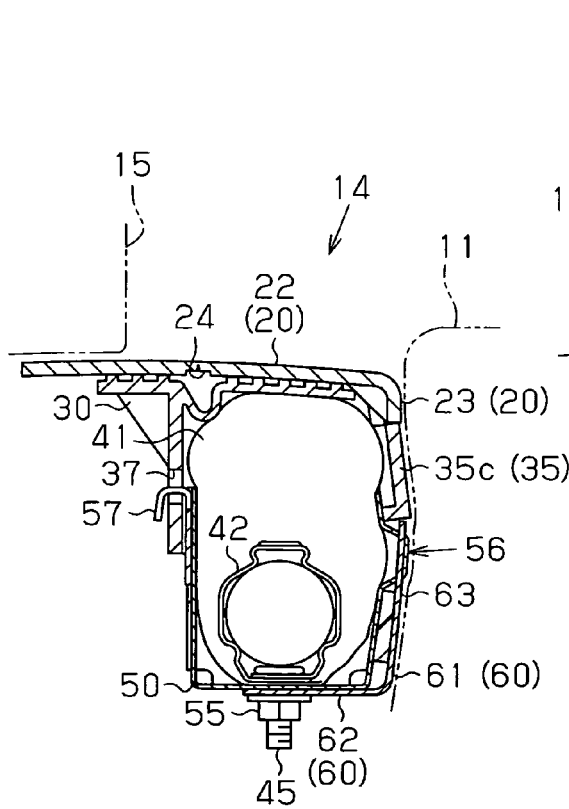
FIG. 12A is a cross-sectional view showing the side airbag device immediately after inflation of the airbag starts.

As shown in FIG. 12A, when the airbag 41 inflates to a certain extent, the airbag 41 is pressed against the outer cover 20, the inner cover 30, and the box 50. Thus, high pressure acts on the outer cover 20, the inner cover 30, and the box 50. This applies tensile stress to each part of the outer cover 20, the inner cover 30, and the box 50. The housing 34 of the inner cover 30 and the box 50 slightly deform but continue to hold the airbag 41 in the box 50. When the tensile force applied to the outer cover 20 becomes large, the thin portion 24 formed in the outer cover 20 and having low strength ruptures.

Figure 12B:
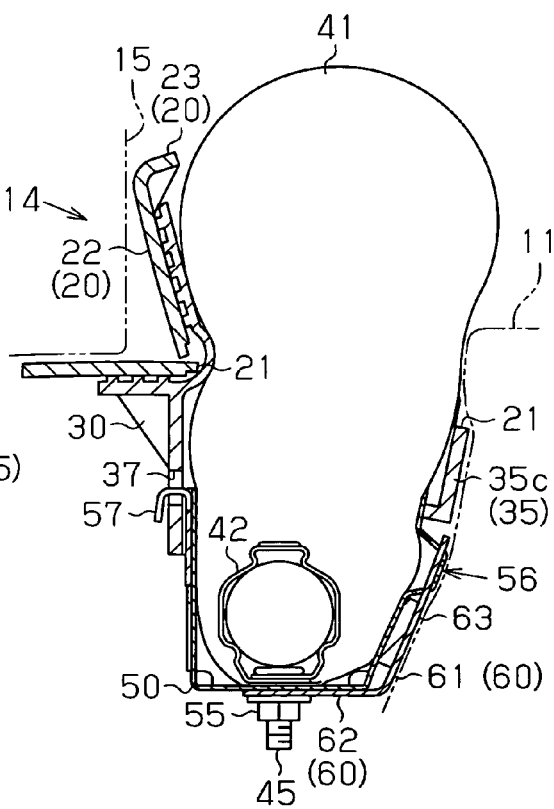
FIG. 12B is a cross-sectional view showing the side airbag device when the airbag is further inflated and an opening forms in the outer cover.

As shown in FIG. 12B, the part corresponding to the opening 21 of the outer cover 20 ruptures. The same part is further pressed by the inflating airbag 41. Thus, the part corresponding to the opening 21 of the outer cover 20 pivots with the door 32 of the inner cover 30 about the hinge 33 of the inner cover 30. The pivoting widely opens the opening 21 of the outer cover 20, and the airbag 41 is inflated outward into the passenger compartment from the opening 21. The inflated airbag 41 is deployed between the body 15 and the occupant sitting in the rear seat 11 (see FIG. 2).

The operation of the side airbag device 14 of this embodiment will now be discussed.

In the side airbag device 14, the pressure produced during inflation of the airbag 41 ruptures the thin portion 24 of the outer cover 20 and forms the opening 21 in the outer cover 20. The airbag 41 is then inflated in the passenger compartment through the opening 21 of the outer cover 20. In this embodiment, the entire end of the part A corresponding to the opening 21 of the outer cover 20 and facing toward the rear seat 11 defines a portion of the end of the outer cover 20. Thus, the entire end of the part A corresponding to the opening 21 and facing toward the rear seat 11 does not include the thin portion 24. In other words, the entire end of the part corresponding to the opening 21 of the outer cover 20 and facing toward the rear seat 11 is not connected to other parts of the outer cover 20 before inflation of the airbag. Thus, compared to a device using an outer cover (see FIG. 13) including a thin portion that has an end defined along the end of the outer cover 20, the entire length of the thin portion 24 formed in the outer cover 20 can be reduced. This simplifies the setting of the timing and position of the thin portion 24 ruptures. Thus, the opening 21 can be formed at a desired timing during inflation of the airbag 41, and the opening 21 can be formed with the desired shape. Accordingly, the airbag 41 is properly deployed.

If the end of the outer cover 20 facing toward the rear seat 11 at the part corresponding to the opening 21 is exposed to the passenger compartment, the appearance and ornamentality of the outer cover 20 becomes poor.

In this embodiment, in the outer cover 20, the end of the part corresponding to the opening 21 and facing toward the rear seat 11 is formed on the second wall 23, which extends from the first wall 22 toward the airbag 41 and along the side surface of the rear seat 11. Thus, the end of the part corresponding to the opening 21 and facing toward the rear seat 11 is not exposed to the passenger compartment. This prevents the ornamentality of the outer cover 20 from becoming poor.

Furthermore, high pressure acts on the part corresponding to the opening 21 of the outer cover 20 during inflation of the airbag 41. In the side airbag device 14, the portion where high pressure is applied is the boundary of the first wall 22 and the second wall 23 that forms a bent portion at. Thus, the bent portion and its surrounding portion may be deformed or broken during the inflation of the airbag 41. This would deviate the timing the opening 21 is formed during inflation of the airbag 41 or hinder formation of the opening 21 with the desired shape.

In this embodiment, at the part corresponding to the opening 21 of the outer cover 20, a plurality of ribs 25 are formed so as to face the airbag 41 at the boundary of the first wall 22 and the second wall 23. The boundary of the first wall 22 and the second wall 23 is reinforced by the ribs 25. This prevents the boundary of the first wall 22 and the second wall 23 and the surrounding portion from being deformed or broken. Furthermore, the ribs 25 prevent the airbag 41 from entering the boundary portion. This prevents the airbag 41 from getting caught at the boundary.

In this embodiment, the plurality of ribs 25 includes linear projections extending along the lateral direction of the outer cover 20. The ribs 25 extend in the direction in which the airbag 41 is inflated out of the part corresponding to the opening 21 of the outer cover 20 that is pushed by the airbag 41. This restricts movement of the airbag 41 in a direction intersecting the ribs 25 at the portion of contact between the rib 25 and the airbag 41. Thus, the airbag 41 is accurately inflated in the direction in which the ribs 25 extend.

It is desirable that the outer cover 20 have high ornamentality. It is also desirable that the housing 34 of the inner cover 30, which functions as a case for accommodating the airbag 41, prevents the airbag 41 from extending toward the rear seat 11. Thus, the required functions differ between the outer cover 20 and the case. From this aspect, the outer cover 20 and the inner cover 30 are formed from different materials in this embodiment. The outer cover 20 is formed from a material that allows for high ornamentality to be obtained, and the inner cover 30 is formed from a material differing from the outer cover 20. The inner cover 30 formed in such a manner prevents the airbag 41 from extending toward the rear seat 11 and thereby properly deploys the airbag 41.

The surface of the side airbag device 14 near the rear seat 11 is formed by the outer cover 20 and the inner cover 30. Thus, a stepped portions would be formed at the boundary of the outer cover 20 and the inner cover 30 when they are connected to each other. If a stepped portion were to be formed at the boundary between the two components, when an occupant's hand is inserted between the rear seat 11 and the side airbag device 14, the stepped portion would be touched by the hand and the occupant may feel uncomfortable.

In the present embodiment, the surface of the outer cover 20 facing toward the rear seat 11 and the surface of the inner cover 30 facing toward the rear seat 11 are flush with each other. Thus, a stepped portion is not formed at the surface of the side airbag device 14 near the rear seat 11. Therefore, even if an occupant inserts his or her hand between the rear seat 11 and the side airbag device 14, the occupant will not feel uncomfortable.

Further, if either one of the outer cover 20 and the inner cover 30 is formed from a material other than resin such as a metal material, when the an occupant's hand is inserted between the rear seat 11 and the side airbag device 14, the feel of the touch would change greatly at the boundary of the outer cover 20 and the inner cover 30. Thus, the occupant may feel uncomfortable.

In this embodiment, the outer cover 20 and the inner cover 30 are both formed from resin material. This prevents changes in the feel of touch at the boundary of the outer cover 20 and the inner cover 30 and prevents the occupant from feeling uncomfortable.

At the part where the surface of the side airbag device 14 near the rear seat 11 is formed by the surface of the inner cover 30 that faces toward the rear seat 11, the inner cover 30 and the outer cover 20 overlap each other in a state in which the inner cover 30 is located closer to the airbag 41 than the outer cover 20.

In this case, the following structure may be employed so that the surface of the outer cover 20 facing toward the rear seat 11 is flush to the surface of the inner cover 30 facing toward the rear seat 11. As shown by the double-dashed line in FIGS. 8A and 8B, the surface Fb of the wall portion 35a in the inner cover 30 may be formed to be flush with the surrounding surface Fc such that part of the wall portion 35a including the side surface of the side airbag device 14 facing toward the rear seat 11 is thick. In this case, the internal space of the case accommodating the airbag 41, specifically, the housing 34 of the inner cover 30 and the box 50 becomes small.

With regard to this matter, in this embodiment, the part of the wall portion 35a forming the side surface of the side airbag device 14 that faces toward the rear seat 11, specifically, the surface Fb opposite to the surface Fa of the projecting portion 35c that faces toward the rear seat 11 is depressed from the surrounding surface Fc, as shown in FIGS. 8A and 8B. Thus, compared to when the surface Fb is flush with the surrounding surface Fc as shown by the double-dashed line in FIG. 8B, the internal space of the case accommodating the airbag 41 can be enlarged, and the degree of freedom for accommodation and inflation of the airbag 41 is increased. In addition, the thickness of the wall portion 35a of the inner cover 30 may be maintained.

The present embodiment has the advantages described below.

(1) The end of the part corresponding to the opening 21 of the outer cover 20 and facing toward the rear seat 11 is entirely formed in the outer cover 20. Thus, the opening is formed at a desired timing during inflation of the airbag 41, and the opening 21 is formed to have a desired shape. This enables proper deployment of the airbag 41.

(2) The end of the part corresponding to the opening 21 and facing toward the rear seat 11 is formed in the second wall 23, which extends from the first wall 22 towards the airbag 41 and along the side surface of the rear seat 11. This prevents the ornamentality of the outer cover 20 from becoming poor even though part of the rim defining the opening 21 is formed in the outer cover 20.

(3) At the part corresponding to the opening 21 of the outer cover 20, the plurality of ribs 25 are formed to face toward the airbag 41 at the boundary of the first wall 22 and the second wall 23. The ribs 25 prevent the boundary of the first and second walls 22 and 23 from being deformed or broken. This deploys the airbag 41 in a further proper manner.

(4) The plurality of ribs 25 extend along the inflation direction of the airbag 41. This properly inflates the airbag 41 along the direction in which the ribs 25 extend.

(5) In the part near the first wall 22 of the outer cover 20 that forms the surface of the side airbag device 14 facing toward to the rear seat 11, the surface of the second wall 23 of the outer cover 20 that faces toward the rear seat 11 is flush with the surface of the inner cover 30 that faces toward the rear seat 11. Thus, a stepped portion is not formed in the part near the first wall 22 that forms the surface of the side airbag device 14 facing toward to the rear seat 11. Therefore, even if an occupant inserts his or her hand between the rear seat 11 and the side airbag device 14, the occupant does not feel uncomfortable.

(6) In the wall portion 35a of the inner cover 30 forming the surface of the side airbag device 14 facing toward the rear seat 11, the surface Fb opposite to the surface Fa of the wall portion 35a that faces toward the rear seat 11 is entirely depressed towards the rear seat 11 from the surrounding surface Fc. Thus, compared to when a recess is not formed in the surface Fb, the internal space of the case for accommodating the airbag 41 is enlarged, and the degree of freedom for accommodation and inflation of the airbag increases.

(7) At the part where the surface of the side airbag device 14 that faces toward the rear seat 11 is formed by the surface of the inner cover 30 that faces toward the rear seat 11, the inner cover 30 and the outer cover 20 overlap each other in a state in which the inner cover 30 is closer to the airbag 41 than the outer cover 20. This enlarges the internal space of the case accommodating the airbag 41 without decreasing the thickness of the inner cover 30.

(8) The outer cover 20 and the inner cover 30 that form the surface of the side airbag device 14 facing toward the rear seat 11 are both formed from resin material. Thus, when an occupant inserts his or her hand between the rear seat 11 and the side airbag device 14, the occupant does not feel uncomfortable.

The present embodiment may be modified as below.

The inner cover 30 and the box 50 may be integrally formed using the same mold and the same material. This would reduce the number of components for the side airbag device. The weight becomes lighter when integrally forming the inner cover 30 and the box 50 with a resin material compared to a device that uses a metal box 50.

In the preferred embodiment, the hinge 33 of the inner cover 30 elastically deforms and pivots the part of the outer cover 20 corresponding to the opening 21 to form the opening 21 in the outer cover 20. However, the present invention is not limited in such a manner. For example, part of the outer cover 20 may be formed to remain without being ruptured during inflation of the airbag 41, and the remaining part may be elastically deformed to pivot the part corresponding to the opening 21 of the outer cover 20. In this case, the door 32 and the hinge 33 of the inner cover 30 and part of the thin portion 24 of the outer cover 20 may be eliminated.

In the present embodiment, the surface Fb in the wall portion 35a of the inner cover 30 is entirely depressed from the surrounding surface Fc. However, the present invention is not limited in such a manner. For example, the surface Fb may be partially depressed from the peripheral surface Fc. Alternatively, the surface Fb may be flush with the surrounding surface Fc and not be depressed.

If the surfaces of the outer and inner covers 20 and 30 facing toward the rear seat 11 that form the surface of the side airbag device 14 facing toward the rear seat 11 are formed along the same plane, the plane does not have to be flat and may be round or smoothly curved.

The outer and inner covers 20 and 30 may be formed so that the surface of the outer cover 20 facing toward the rear seat 11 and the surface of the inner cover 30 facing toward the rear seat 11 that form the surface of the side airbag device 14 facing toward the rear seat 11 are arranged on different planes. In such a case, it is desirable that a stepped portion not be formed at the boundary between the two surfaces of the outer cover 20 and the inner cover 30 facing toward the rear seat 11 to prevent the occupant from feeling uncomfortable when inserting a hand between the rear seat 11 and the side airbag device 14.

In the preferred embodiment, the part farther from the first wall 22 than the end of the second wall 23 of the outer cover 20 in the wall of the side airbag device 14 facing toward the rear seat is formed by the wall portion 35a of the inner cover 30. Instead, this part may be formed by a wall member that differs from the outer cover 20 and the inner cover 30. In such a case, if a stepped portion is not formed at the boundary of the outer cover 20 and the wall member, the occupant will not feel uncomfortable even when inserting a hand between the rear seat 11 and the side airbag device 14.

The ribs 25 may be formed in a direction that differs from the inflation direction of the airbag 41. Further, the ribs 25 may be omitted from the outer cover 20.

In the preferred embodiment, the end of the part corresponding to the opening 21 of the outer cover 20 that faces toward the rear seat 11 is formed by the second wall 23 of the outer cover 20. Instead, as shown in FIG. 14, the end (part Gp shown in FIG. 14) may be formed at the boundary of the first wall 22 and the second wall 23 as in an outer cover 70. Furthermore, as shown in FIG. 15, in an outer cover 80, an end Hp of the part corresponding to the opening 21 and facing toward the rear seat 11 of the outer cover 80 may be formed in the first wall 22. Furthermore, in addition to the device in which the end Gp shown in FIG. 14 and the end Hp shown in FIG. 15 are cut in advance, the present invention may be applied to a device in which the end Gp and the end Hp are thin portions. The present invention may be applied as long as a device has a surface facing toward the rear seat 11 that is formed by the surface of the second wall 23 of the outer cover 20 facing toward the rear seat 11 and the surface of the inner cover 30 (or wall member) facing toward the rear seat 11.

The present invention may be applied to a side airbag device arranged between the body of the vehicle and the seat cushion of a rear seat.

The present examples and embodiments are to be considered as illustrative and not restrictive, and the invention is not to be limited to the details given herein, but may be modified within the scope and equivalence of the appended claims.

What is claimed is:

1. A side airbag device for use in a vehicle having a body, passenger compartment, and a rear seat, the side airbag device comprising:
    an airbag accommodated in a folded state between the body of the vehicle and the rear seat of the vehicle, with the airbag being inflated and deployed in the passenger compartment between the vehicle body and an occupant seated on the rear seat when an impact greater than a predetermined level is applied to the vehicle body; and
    a cover exposed to the passenger compartment and covering a space between the body and the rear seat from the passenger compartment, with the cover including a thin portion formed in a wall defining a surface exposed to the passenger compartment, the thin portion being ruptured by pressure produced during inflation of the airbag to form an opening in the cover, and the airbag being inflated into the passenger compartment through the opening;
    wherein the cover includes a part corresponding to the opening having an end facing toward the rear seat that is entirely formed by an end of the cover,
    wherein the cover includes a first wall, which covers the space between the body and the rear seat from the passenger compartment, and a second wall, which extends from the first wall towards the airbag along a side surface of the rear seat, and the part corresponding to the opening of the cover has an end facing toward the passenger compartment formed by the second wall of the cover,
    wherein the cover has a bent portion at a boundary of the first wall and the second wall, and the part corresponding to the opening of the cover includes a rib formed at the bent portion near the airbag, and
    wherein the second wall abuts the side surface of the rear seat, and a hinge is provided apart from the rear seat in the cover, and the part corresponding to the opening of the cover pivots about the hinge.

2. The side airbag device according to claim 1, wherein the rib extends in a direction in which the airbag is inflated.

3. The side airbag device according to claim 1 further comprising:
    a wall member facing toward the rear seat, the wall member being arranged distant from the first wall,
    wherein the wall member is formed from a material that differs from that of the cover.

4. The side airbag device according to claim 3, further comprising:
    a case for accommodating the airbag in the folded state, with the case being formed from a material differing from that of the cover;
    wherein the wall member defines a wall of the case facing toward the rear seat.

* * * * *